(12) United States Patent
Chesson et al.

(10) Patent No.: US 7,526,092 B2
(45) Date of Patent: Apr. 28, 2009

(54) REKEY OPERATION WITH MULTIPLEXING CAPABILITY

(75) Inventors: Gregory L. Chesson, Palo Alto, CA (US); Nancy Cam-Winget, Mountain View, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 20 days.

(21) Appl. No.: 11/764,151

(22) Filed: Jun. 15, 2007

(65) Prior Publication Data
US 2007/0253554 A1    Nov. 1, 2007

Related U.S. Application Data

(62) Division of application No. 10/095,178, filed on Mar. 8, 2002, now Pat. No. 7,245,724.

(51) Int. Cl.
*H04K 1/00*  (2006.01)
*H04L 9/00*  (2006.01)

(52) U.S. Cl. .................. 380/273; 380/270; 380/277; 380/278

(58) Field of Classification Search ............... 380/273, 380/270, 277–278; 713/171
See application file for complete search history.

(56) References Cited

U.S. PATENT DOCUMENTS

| | | | |
|---|---|---|---|
| 4,613,901 A * | 9/1986 | Gilhousen et al. ........... 380/239 |
| 5,619,572 A | 4/1997 | Sowa | |
| 5,706,348 A | 1/1998 | Gray et al. | |
| 5,768,380 A | 6/1998 | Rosauer et al. | |
| 5,805,705 A | 9/1998 | Gray et al. | |
| 2002/0018571 A1 | 2/2002 | Anderson et al. | |

* cited by examiner

*Primary Examiner*—Hosuk Song
(74) *Attorney, Agent, or Firm*—Bever, Hoffman & Harms, LLP; Jeanette S. Harms (57) ABSTRACT

A method of providing a protocol for rekeying between two stations is disclosed. The method can include providing a first set of messages for computing a new key and reserving an auxiliary storage area for the new key. The first set of messages comprises an enable exchange. The method also includes providing a second set of messages to obsolete an old key and switch to the new key. The second set of messages comprises a transition exchange. In one embodiment, the protocol includes rekeying between multiple stations, and the rekey coordinator sends the first set of messages to a plurality of rekey participants. The auxiliary storage area allows multiplexing in both the enable and transition exchanges, thereby facilitating an efficient and safe rekey operation.

31 Claims, 5 Drawing Sheets

| Nonce 401 | Cipher Suit 402 | Version Number 403 | KeyIDping 404 | KeyIDpong 405 | Key Sequence 406 | Max Packet Count 407 | Rekey Count 408 | Rekey Period 409 | MIC 410 |

Security Association Information Element 400

Figure 4

| Nonce | Cipher Suit | Version Number | Key Sequence | KeyID 501 | Rekey Count | Rekey Period | MIC |

Rekey Information Element 500

REKEY OPERATION WITH MULTIPLEXING CAPABILITY

RELATED APPLICATIONS

This application is a divisional of U.S. patent application Ser. No. 10/095,178, entitled "Rekey Operation With Multiplexing Capability" filed Mar. 8, 2002.

BACKGROUND OF THE INVENTION

1. Field of the Invention

The present invention relates to encryption of packets transferred over a wireless local-area network (WLAN), and particularly to a rekey operation that ensures a safe transition from an old encryption key to a new encryption key while minimizing storage area to perform the rekey operation.

2. Discussion of the Related Art

The 1999 Institute of Electrical and Electronic Engineers (IEEE) 802.11 standard describes a cost-effective, robust, high-performance wireless LAN technology. In wireless communication, messages can be transmitted as packets of data over a channel, wherein a packet has a header (e.g. including the receiver's address) as well as data. These packets can be place in a queue to facilitate efficient transmission. In compliance with the 1999 IEEE 802.11, the receiver receives these packets in the order transmitted by the sender.

Figure 1:
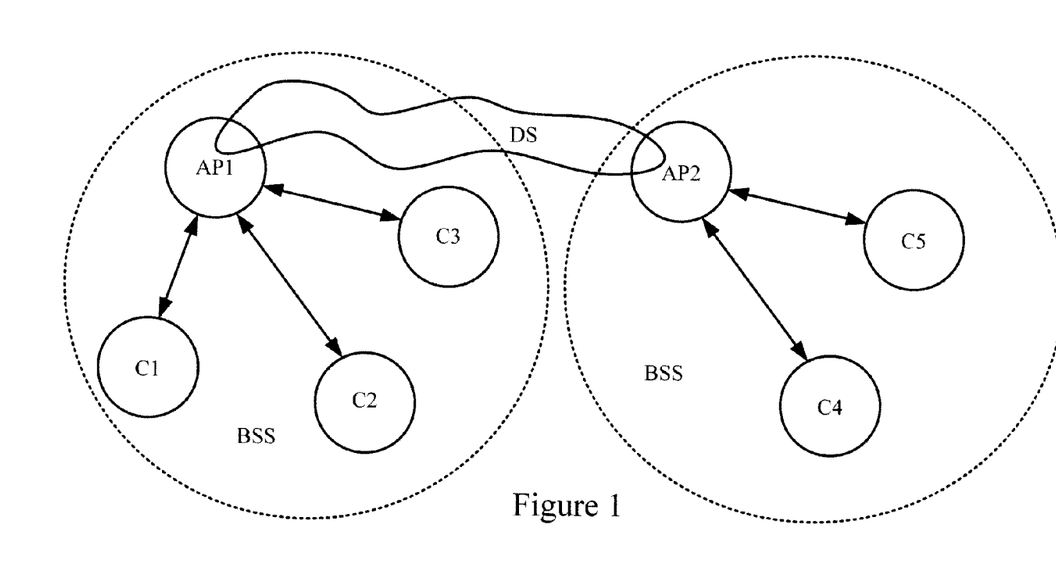
FIG. 1 illustrates an infrastructure mode.

Wireless communication can be characterized by two modes of operation: an infrastructure mode and an ad hoc mode. FIG. 1 illustrates an infrastructure mode, wherein an access point AP1 communicates with a plurality of clients C1, C2, and C3. Note that in order for client C1 to communicate with client C3, client C1 must communicate via access point AP1. An access point is a client that provides a distribution service (DS) and thus enables clients within the infrastructure to communicate between each other or to an external wired or wireless client.

Access point AP1 also serves as a distributor for clients C1, C2, and C3 to communicate with wired or wireless clients not associated with access point AP1. For example, access point AP1 can communicate with another access point either directly or through a distribution service (DS), such as access point AP2, which in turn can be associated with a plurality of clients C4 and C5.

Figure 2:
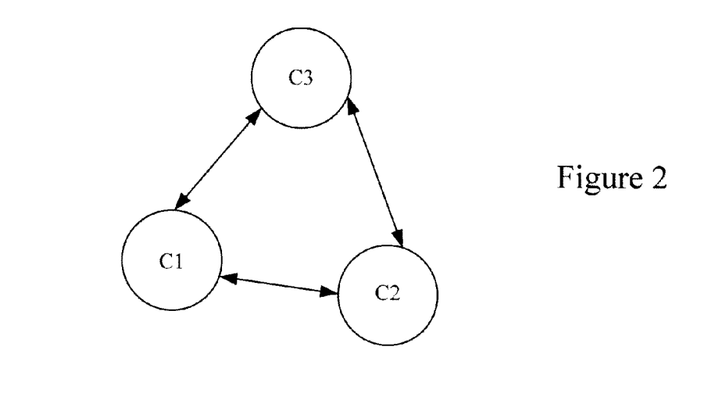
FIG. 2 illustrates an ad-hoc mode.

In contrast, FIG. 2 illustrates an ad hoc (also called a peer-to-peer) mode, wherein clients C1, C2, and C3 can communicate directly without an access point. In this mode, each client can only communicate with other wireless clients associated to it but has no access to any other wired or wireless clients.

Note that a sender (or a receiver) could be an access point or a client in accordance with standard characterizations. The term "station", as used herein, can generically refer to either an access point (in the AP mode) or a client (in the AP or ad-hoc mode).

To provide a level of security, wireless systems allow for encrypted communication. Communication between wireless stations can be encrypted using a symmetric key cryptographic algorithm. The encryption key's lifespan depends on both the length of the nonce (i.e. a pseudo-random or counter-derived value used with the encryption key), and the communicating data rates. For example, if the nonce is relatively short, then the lifespan of the maximum security provided by that encryption may be exhausted during a communications session spanning hours or even minutes; the higher the data rate, the shorter the lifespan. The 1999 IEEE 802.11 standard includes encryption as a service; however, it omits any specification for how encryption keys are obtained as well as how these keys may be updated.

A constraint arising when encryption is introduced into a wireless system is the demand in key management and storage area requirements. For example, referring back to FIG. 1, assume that encryption is desired in the communication links associated with access points AP1 and AP2 as well as clients C1-C5. In this case, a minimum of six symmetric encryption keys would be necessary, i.e. one key for each link of AP1/C1, AP1/C2, AP1/C3, AP2/C4, AP2/C5, and AP1/AP2. Many communications between the access points and their associated clients may require at least one change of the encryption key. This changing of the use of an old encryption key to a new encryption key is called a rekey operation.

For an access point, storing multiple keys for each client rapidly becomes commercially non-viable as the number of clients increases. Specifically, each key takes up a finite storage area. Thus, focusing on access point AP1 and assuming only one rekey is necessary for each link (AP1/C1, AP1/C2, AP1/C3, and AP1/AP2), storage of 8 encryption keys for access point AP1 is not a problem, but increasing its service to 100 clients (thereby creating 101 links and 202 encryption keys) would dramatically increase its storage area requirements.

An issue that arises when encryption is introduced into a wireless system is the management of the shared symmetric encryption key. While secure protocols for key exchange and key distribution exist, they are not included in the 1999 IEEE 802.11 specification. Thus, while it is feasible to accrue the information to manage a rekey operation, there is no specified protocol to affect a rekey.

Another issue arising from encryption is the assumption on data packet ordering. In the 1999 IEEE 802.11 specification, data packets are assumed to be transmitted and received in order. However, in future extensions providing for quality of service (QOS), the notion of priority queues is introduced. In priority queues, multiple traffic queues are present and are gated by priority. Thus, once communication between an access point and a client is begun, data packets are no longer guaranteed to arrive in order. Therefore, data packets are not guaranteed to arrive in any particular order, thereby preventing the use of implicit heuristics to determine when a new key has taken full effect.

In light of these problems, a need arises for a system and method of minimizing key storage area while ensuring a safe rekey operation.

SUMMARY OF THE INVENTION

In accordance with one feature of the invention, a method of providing a protocol for rekeying between two stations is disclosed. The method can include providing a first set of messages for computing a new key and reserving an auxiliary storage area for the new key. The first set of messages comprises an enable exchange. The method can also include providing a second set of messages to obsolete an old key and switch to the new key. The second set of messages comprises a transition exchange. In one embodiment, the protocol includes rekeying between multiple stations, and the rekey coordinator sends the first set of messages to a plurality of rekey participants. The auxiliary storage area allows multiplexing in both the enable and transition exchanges, thereby facilitating an efficient and safe rekey operation.

The first set of messages can include a request from a rekey coordinator to a rekey participant to activate the new key and to store the new key in the auxiliary storage area. The first set of messages can also include a response from the rekey participant to the rekey coordinator that indicates the rekey participant has activated the new key and has stored the new key in its auxiliary storage area.

The second set of messages can include a request from the rekey coordinator to the rekey participant to start using the new key in its auxiliary storage area for new packets. The second set of messages can further indicate that the rekey coordinator and rekey participant will use the new key for new packets. The second set of messages can further indicate that the old key is no longer in use. The second set of messages can further indicate that the new key can be moved from the auxiliary storage area to a static storage area.

A system for updating an encryption key is also provided. The system can include a rekey coordinator and a rekey participant, wherein one of the rekey coordinator and the rekey participant can initiate an enable exchange. The enable exchange triggers an activation of a new key and reserves auxiliary locations for the new key in both the rekey coordinator and the rekey participant. Of importance, only the rekey coordinator can initiate a transition exchange, wherein the transition exchange synchronizes a transition from an old key to the new key.

In one embodiment, the rekey coordinator can include an access point and the rekey participant can include a client. In another embodiment, the rekey coordinator can include a first access point and the rekey participant can include a second access point. The rekey coordinator is the station typically communicating with multiple clients and thus managing the encryption keys for each link. The rekey participant is typically the consumer of a rekey operation. In this system, the rekey coordinator can send an enable request to the rekey participant during the enable exchange. In the enable request, the rekey participant is asked to activate the new key and reserve a temporary storage area in the rekey participant for the new key. The rekey participant can send an enable response to the rekey coordinator during the enable exchange. The enable response indicates that the rekey participant has activated the new key and stored the new key in its temporary storage area.

During the transition exchange, the rekey coordinator can send a transition request to the rekey participant when it has ensured transmitted data packets are solely using the new key in the auxiliary storage. The transition request can indicate that the rekey coordinator has also activated the new key, stored the new key in its own temporary storage area, flushed its transmit queue of packets using the old key, and will use only the new key for new packets. The rekey participant can then send a transition response to the rekey coordinator that indicates the rekey participant has flushed its transmit queue of packets using the old key, updated its fixed storage location with the new key, and will use only the new key for new packets. Finally, the rekey coordinator can send a confirmation to the rekey participant that indicates the rekey coordinator has updated its fixed storage location with the new key, thereby freeing its temporary storage location.

A rekeying sequence for a controlling station is also provided. The rekeying sequence includes determining that another station has activated a new key, stored the new key in a first auxiliary location in the other station, and will use the new key for new packets. The controlling station can then, when appropriate, activate the new key and store the new key in a second auxiliary location in the controlling station. After flushing its transmission queue, the controlling station can send a first message to the other station indicating that it has sent its last packet using an old key and will use the new key for new packets. When the controlling station has determined that the other station has also sent its last packet using the old key, the controlling station can update a fixed location with the new key and release the second auxiliary location. The rekeying sequence can further include requesting the other station to activate the new key and to store the new key in the first auxiliary location. The rekeying sequence can further include sending a second message to the other station indicating that the controlling station has released the second auxiliary location.

In one embodiment, if the other station has not activated the new key and stored the new key in the first auxiliary location after a certain period of time, then the controlling station can enter a predetermined timeout. If a retry count is less than a predetermined number of retries after the predetermined timeout, then the controlling station can repeat the step of requesting. If the retry count is not less than the predetermined number of retries after the predetermined timeout, then the controlling station can terminate the rekeying sequence.

In another embodiment, if the other station has not yet sent its last packet using the old key within a certain period of time, then the controlling station can enter a predetermined timeout. If a retry count is less than a predetermined number of retries after the predetermined timeout, then the controlling station can repeat the step of sending the first message. If the retry count is not less than the predetermined number of retries after the predetermined timeout, then the controlling station can terminate the rekeying sequence.

A rekeying sequence for a non-controlling station is also provided. The rekeying sequence can include sending a first message to a controlling station indicating that the non-controlling station has activated a new key and stored the new key in an auxiliary location in the non-controlling station. The non-controlling station determines when the controlling station has activated the new key, stored the new key in its auxiliary location, and will use the new key for new packets. After the non-controlling station has sent its last packet using an old key, the non-controlling station can send a second message to the controlling station indicating the transmission of this last packet. At this point, the non-controlling station can update a fixed location with the new key and release the auxiliary location.

If the controlling station has not activated the new key and stored the new key in the auxiliary location within a certain period of time, then the non-controlling station can enter a predetermined timeout. If a retry count is less than a predetermined number of retries after the predetermined timeout, then the non-controlling station can repeat the step of sending the first message. If the retry count is not less than the predetermined number of retries after the predetermined timeout, then the non-controlling station can terminate the rekeying sequence.

If the controlling station has not yet sent its last packet using the old key within a certain period of time, then the non-controlling station can enter a predetermined timeout. If a retry count is less than a predetermined number of retries after the predetermined timeout, then the non-controlling station can repeat the step of sending the second message. If the retry count is not less than the predetermined number of retries after the predetermined timeout, then the non-controlling station can terminate the rekeying sequence.

A computer program product in a rekey coordinator for performing a rekey operation is also provided. The computer program product includes a first set of instructions for computing a new key and reserving an auxiliary storage area for the new key. The computer program product further includes a second set of instructions for obsoleting an old key and switching to the new key. In one embodiment, the rekeying is applicable to multiple stations, and the first set of instructions is communicated to a plurality of rekey participants.

DETAILED DESCRIPTION OF THE FIGURES

Stations share cryptographic keying material (e.g. an encryption key and a nonce) to establish a security association that protects packets transferred between the stations. As used herein, this cryptographic keying material (hereinafter called a key) is unique to a particular link, i.e. no other security association is known to be based on the same key.

In a system using a key, each station monitors the number of protected packets it sends under the security association. Note that within a station, packet counts can change from one protocol layer of the station's hierarchy to another layer. For example, the network layer may provide a MAC service data unit (MSDU) of 1 frame, i.e. 1000 bytes, to the data link layer. However, the data link layer may partition this MSDU into multiple packets, thereby providing a MAC management protocol data unit (MPDU) to the physical layer that includes these multiple packets. Thus, instead of the key being used once (according to the network layer), the key is actually used multiple times (according to the physical layer). As used herein, the term "packets" will refer to the actual packets in the physical layer transmitted by the station.

When the packet number reaches a first predetermined level, a station can initiate a rekey operation to continue the security association. However, when the packet number reaches a second, higher predetermined level, the station must terminate transmission or risk non-protected communication. Note that the maximum first and second predetermined levels are cipher-specific, although the system can establish lower (i.e. more conservative) levels.

In accordance with one feature of the invention, a two-phase commit protocol coordinates an orderly transition from an old key to a new key. The first phase of this protocol is called an enable exchange, whereas the second phase is called a transition exchange. In one embodiment, the full key rollover can take five messages. In other embodiments, this rollover can be accomplished in as few as three messages (both embodiments described in reference to FIG. 3A). Advantageously, providing separate phases for the enabling and the transitioning associated with the key rollover allows for multiplexing of these phases, thereby allowing a station to rekey several security associations simultaneously.

As used in the context of a basic service set (BSS), i.e. a set of IEEE 802.11-compliant stations that operate as a fully connected wireless network (see FIG. 1), the term "rekey coordinator" refers to an access provider (AP) and the term "rekey participant" refers to a client. In the context of an independent BSS (IBSS), i.e. a set of clients acting independently, the rekey coordinator can be defined by the system. For example, in one embodiment, the rekey coordinator can be defined as the station with the larger MAC (Media Access Control) address, where MAC addresses are represented as little-endian integers. Thus, in an IBSS, a station could be a rekey coordinator for one security association, but a rekey participant for another security association. As described in detail below, although either the rekey coordinator or the rekey participant can initiate the enable exchange, the rekey coordinator must initiate the transition exchange.

Protocol Overview

Figure 3A:
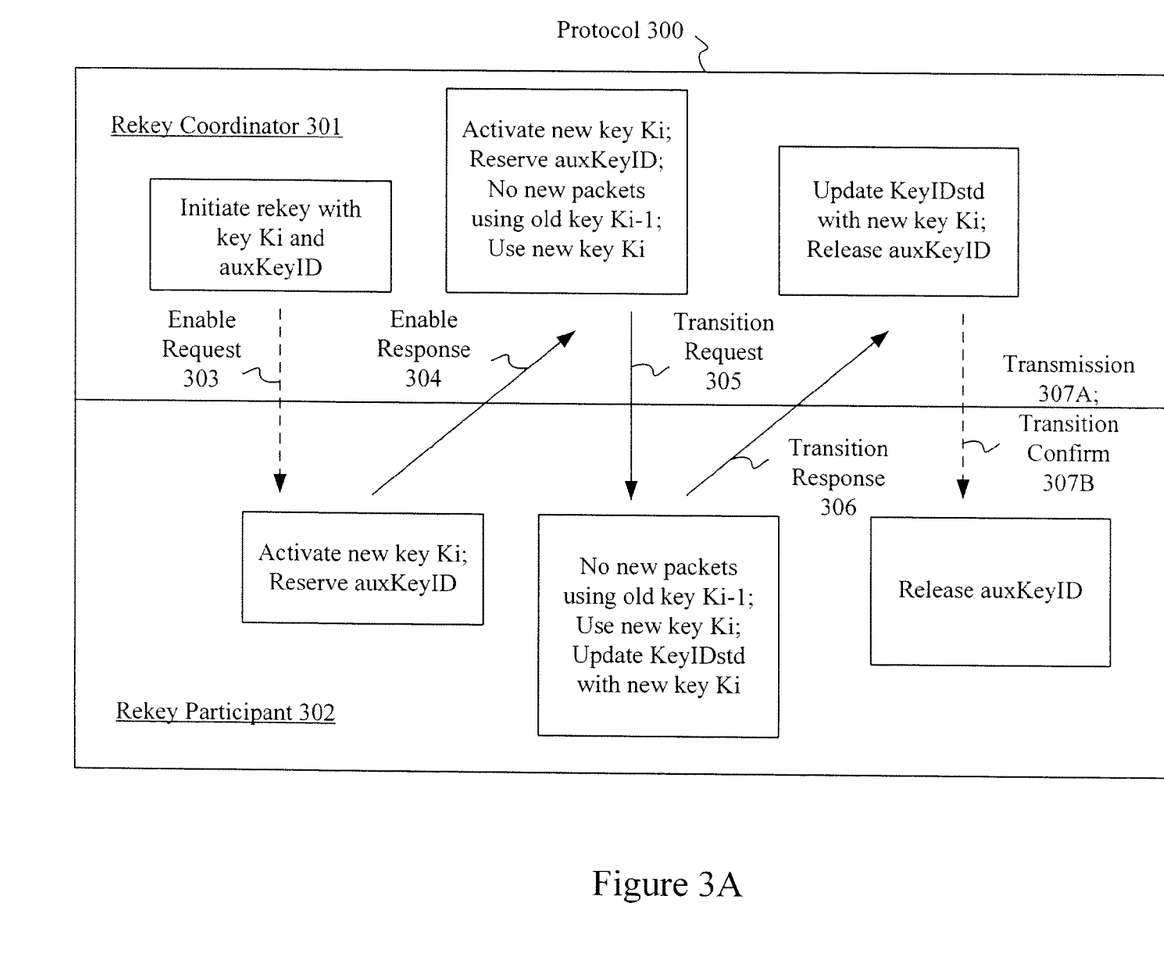
FIG. 3A illustrates a rekey protocol in accordance with one embodiment of the invention.

FIG. 3A illustrates an exemplary protocol 300 to implement enable and transition exchanges in accordance with one embodiment of the invention. In protocol 300, the enable exchange can include two messages: an enable request 303 and an enable response 304. In enable request 303, rekey coordinator 301 requests that rekey participant 302 activate a new key Ki and reserve an auxiliary KeyID, i.e. a temporary location for the new key during the rollover from old to new key (that is, during the time interval when both the old and new keys can be active). Hereinafter, the auxiliary KeyID will be referenced as auxKeyID. After receiving enable request 303, rekey participant 302 activates the new key Ki and reserves an auxKeyID for new key Ki. Note that to activate the new key Ki rekey participant 302 could activate the new key Ki using information it already has, receive information to compute the new key Ki, or actually receive the new key Ki itself from rekey coordinator 301. Once rekey participant 302 has updated auxKeyID to hold the new key Ki, it sends enable response 304 to rekey coordinator 301.

After receiving enable response 304, rekey coordinator 301 also activates the new key Ki and reserves its own auxKeyID. Note that the physical location for auxKeyID in each station can be different, but is referenced by both stations as auxKeyID. Of importance, rekey coordinator 301 controls the initiation of the transition exchange. Therefore, if a temporary location is unavailable at that point in time, then rekey coordinator 301 merely waits until one does become available before utilizing the new key Ki and reserving the auxKeyID. Until the transition exchange begins, rekey participant 302 can continue to receive and transmit packets using its current key, hereinafter called the "old" key; however it can also receive data packets from rekey coordinator 301 using the new key Ki stored in the auxKeyID.

In this manner, irrespective of which station begins the enable exchange, rekey coordinator 301 can control the process. Thus, if rekey coordinator 301 initiates the rekey operation, then both enable request 303 and enable response 304 are needed for the enable exchange. However, if rekey participant 302 initiates the rekey operation, then only enable response 304 is needed for the enable exchange.

After receiving enable response 304 and activating/storing the new key Ki in auxKeyID, rekey coordinator 301 can begin using the new key Ki to protect new packets it transmits. Specifically, rekey coordinator 301 should not employ the old key Ki−1, which is identified by its standard location KeyID-std, to protect any further packets. However, the old key Ki−1 can still be used to process remaining packets in the transmit queue of rekey coordinator 301 as well as received packets from rekey participant 302. Thus, at this point, rekey participant 302 can receive packets using either new key Ki or old key Ki−1, but transmits packets using only old key Ki−1. As described in further detail below, each packet includes the designated key location, KeyID, thereby allowing the receiver to use the correct key for decryption.

After finishing the transmission of any packets protected under the old key Ki−1, rekey coordinator 301 can initiate the transition exchange. The purpose of the transition exchange is to securely obsolete the old key Ki−1 and safely switch to use of the new key Ki. The transition exchange can include three messages: a transition request 305, a transition response 306, and a transition confirm 307. Rekey coordinator 301 initiates the transition exchange by sending transition request 305, which indicates that (1) rekey coordinator 301 has no more packets protected under the old key Ki−1, (2) rekey participant 302 does not need the old key Ki−1 to process received packets from rekey coordinator 301, (3) henceforth, only the new key Ki (identified by auxKeyID) will be used to protect packets from rekey coordinator 301 to rekey participant 302, and (4) rekey coordinator 301 can still receive packets protected by the old key Ki−1 as well as the new key Ki.

Receiving transition request 305 triggers rekey participant 302 to not protect any new packets with the old key Ki−1. In this manner, rekey participant 302 can flush its transmission queue of packets that were encrypted using the old key Ki−1. As soon as rekey participant 302 has no more packets protected under the old key Ki−1 in its transmission queue, rekey participant 302 sends transition response 306 to rekey coordinator 301. Transition response 306 indicates that (1) henceforth, rekey participant 302 will not use the old key Ki−1, (2) rekey participant 302 will only use new key Ki for its transmissions to rekey coordinator 301, and (3) rekey participant 302 has updated KeyIDstd with new key Ki and requests freeing of its auxKeyID.

At this point, both rekey coordinator 301 and rekey participant 302 are exclusively using new key Ki for both transmitting and receiving of encrypted packets. Thus, upon receiving transition response 306, rekey coordinator 301 can also update its KeyIDstd with the new key Ki, thereby also freeing its auxKeyID for rekeying operations with other stations. However, rekey participant 302 does not know when rekey coordinator 301 is ready to receive with the new key Ki in KeyIDstd, rather than in auxKeyID.

Therefore, in one embodiment, rekey coordinator 301 can respond to transition response 306 in one of two ways. First, if rekey coordinator 301 has data to transmit, then rekey coordinator 301 can merely use the new key Ki, identified by KeyIDstd, to protect the transmitted packets. This transmission 307A can serve as an implied confirmation to rekey participant 302. Second, if rekey coordinator 301 does not have any packets to transmit immediately, then rekey coordinator 301 can send a transition confirm 307B. In either transmission from rekey coordinator 301, the auxiliary KeyID at rekey participant 302 is freed, thereby completing protocol 300.

Note that in one embodiment, one or both of rekey coordinator 301 and rekey participant 302 can have the capability of re-encrypting packets encrypted with the old Ki−1 in their transmission queues with the new key Ki. However, neither station needs to know if the other station has this capability to implement protocol 300. Specifically, if rekey coordinator 301 has this capability, then rekey coordinator 301 can send transition request 305 sooner than if it did not have this capability. Similarly, if rekey participant 302 has this capability, then rekey participant 302 can send transition response 306 sooner than if it did not have this capability.

As described above, protocol 300 can be shortened from five to three messages (wherein the enable request and transition confirm can be omitted). However, the following conditions must be met to ensure three messages complete the rekey operation. In a first condition related to omitting transition confirm 307B, rekey coordinator 301 must begin encrypting packets using the key in KeyIDstd substantially immediately after receiving transition response 306. In a second condition related to omitting enable request 303, if rekey participant 302 initiates the enable exchange, it must be ready to receive packets using both the new key Ki and old key Ki−1, but only transmit using the old key Ki−1. This condition must be met prior to its sending of enable response 304 (note that rekey participant 302 will not send an enable request). In a third condition related to omitting enable request 303, rekey participant 302 must allot a sufficiently long time to allow rekey coordinator 301 to reserve its auxKeyID for this rekey operation. In other words, as previously described, enable coordinator 301 controls completion of the enable exchange and has more storage logistics to handle than enable participant. Therefore, rekey coordinator 301 may need to free up its auxKeyID before the transition exchange can be initiated.

In one embodiment, to meet the third condition as well as ensure that the security association is still on-going while accounting for delays in either station, protocol 300 can include timeouts and retry counts. For example, rekey coordinator 301 can maintain a retransmission timer and retry count to determine the wait period for enable response 304 and transition response 306. In a similar fashion, rekey participant 302 can maintain a retransmission timer and retry count to determine the wait period for transition request 305 and transition confirm 307.

Rekey Coordinator Implementation of Protocol

Figure 3B:
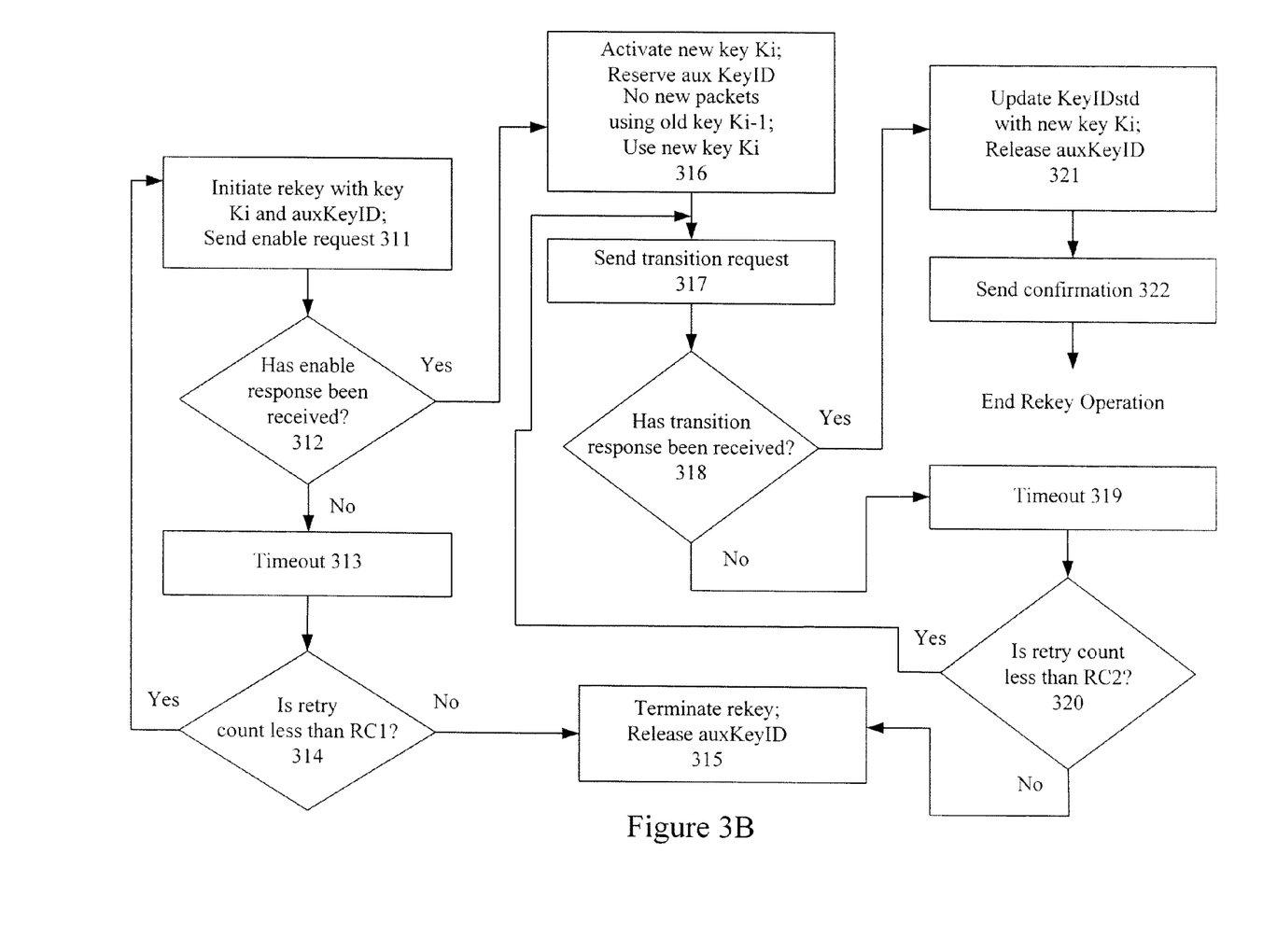
FIG. 3B illustrates one method that can be employed by a rekey coordinator during a rekey operation.

FIG. 3B illustrates the steps that can be taken by a rekey coordinator to implement protocol 300 including timeouts and retrys. In step 311, the rekey coordinator can issue an enable request for the rekey participant to activate a new key Ki and reserve auxKeyID. The rekey coordinator then waits for an enable response from the rekey participant. If the enable response is not received, as determined in step 312, then the rekey coordinator enters a predetermined timeout 313. (Note that this predetermined timeout 313 allows rekey coordinator 301 to continue encrypting and decrypting packets using the old key Ki−1.) After this timeout, if the retry count is less than a first predetermined limit RC1, as determined in step 314, then the rekey coordinator can return to step 311 to send another enable request. However, if the retry count is not less than the first predetermined limit RC1, then the rekey coordinator terminates the rekey operation in step 315, thereby releasing its auxKeyID.

If the enable response is received, as determined in step 312, then the rekey coordinator can activate the new key Ki and reserve its auxKeyId with the new Ki (when the temporary storage location becomes available) in step 316. At this point, the rekey coordinator can begin using the new key Ki to protect new packets. However, the rekey coordinator can still use the old key Ki−1 to process remaining packets in its transmit queue (as necessary) as well as received packets from the rekey participant. After finishing the transmission of any packets protected under the old key Ki−1, the rekey coordinator can initiate the transition exchange by sending a transition request to the rekey participant in step 317.

If the transition response is not received, as determined in step 318, then the rekey coordinator enters another predetermined timeout 319. (Note that this predetermined timeout 319 allows rekey coordinator 301 to continue encrypting new packets with the new key Ki and decrypting packets from rekey participant 302 using the old key Ki−1.) After this timeout, if the retry count is less than a second predetermined limit RC2, as determined in step 320, then the rekey coordinator can return to step 317 to send another transition request.

However, if the retry count is not less than the second predetermined limit, then the rekey coordinator once again terminates the rekey operation in step 315, thereby releasing its auxKeyID.

If the transition response is received, as determined in step 318, then the rekey coordinator can safely update its KeyIDstd with the new key Ki in step 321, thereby freeing its auxKeyID for rekeying operations with other stations. Finally, in step 322, the rekey coordinator can send a confirmation to the rekey participant. This confirmation can be implemented implicitly by sending a transmission using the new key Ki, identified by KeyIDstd, to protect the transmitted packets or explicitly by sending a transition confirm. At this point, for the rekey coordinator, the rekey operation is complete.

Rekey Participant Implementation of Protocol

Figure 3C:
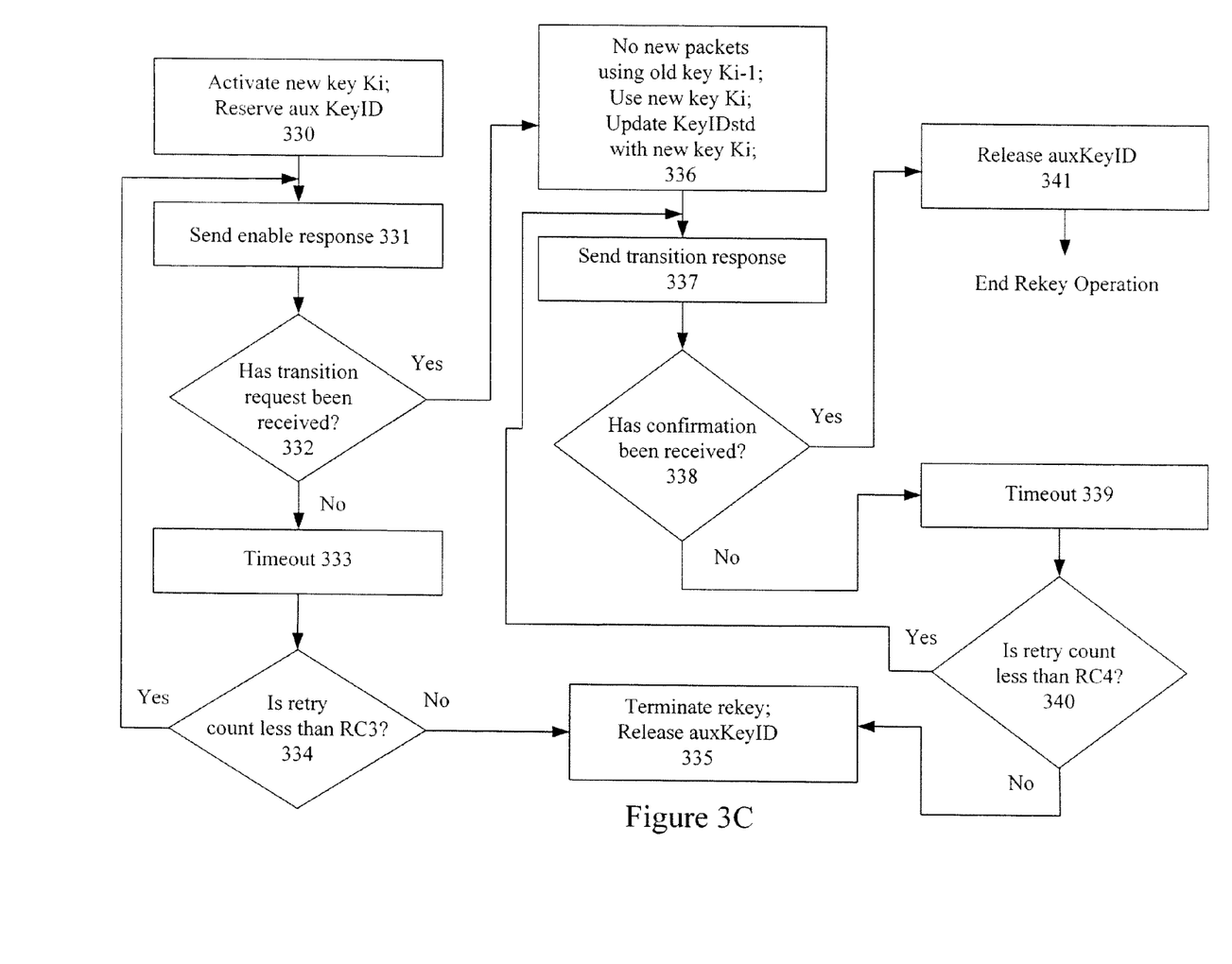
FIG. 3C illustrates one method that can be employed by a rekey participant during a rekey operation.

FIG. 3C illustrates the steps that can be taken by a rekey participant to implement protocol 300 including timeouts and retrys. In step 330, the rekey participant can activate the new key Ki and reserve its auxKeyID. After this step, the rekey participant can send the enable response in step 331. The rekey participant then waits for a transition request from the rekey participant.

If the transition request is not received, as determined in step 332, then the rekey participant enters a predetermined timeout 333. After this timeout, if the retry count is less than a predetermined limit RC3, as determined in step 334, then the rekey participant can return to step 331 to send another enable response. However, if the retry count is not less than the predetermined limit RC3, then the rekey participant terminates the rekey operation in step 335, thereby releasing its auxKeyID.

If the transition request is received, as determined in step 332, then the rekey participant can begin using the new key Ki in step 336 to protect new packets. However, the rekey participant can still use the old key Ki−1 to process remaining packets in its transmit queue. After finishing the transmission of any packets protected under the old key Ki−1, the rekey participant can update its KeyIDstd with the new key Ki. At this point, the rekey participant sends a transition response to the rekey coordinator in step 337. The rekey participant then waits for confirmation from the rekey coordinator.

If confirmation is not received, as determined in step 338, then the rekey participant enters another predetermined timeout 339. After this timeout, if the retry count is less than a predetermined limit RC4, as determined in step 340, then the rekey participant can return to step 337 to send another transition response. However, if the retry count is not less than the RC4 predetermined limit, then the rekey participant once again terminates the rekey operation in step 335, thereby releasing its auxKeyID. If the confirmation is received, as determined in step 338, then the rekey participant can free its auxKeyID. At this point, for the rekey participant, the rekey operation is complete.

Protocol Facilitates Multiplexing

Because keys are mutually independent, new keys Ki for various stations can be pre-computed or distributed in advance of the actual triggering of the enable exchange. However, until the key rollover is complete, temporary storage locations (i.e. auxKeyIDs) are needed to hold the new keys. Thus, particularly in an access point for a large BSS or IBSS, these auxKeyIDs may be a scarce resource, thereby necessitating a reservation sequence.

In one embodiment, the access point could notify all clients that it wants to rekey and establish a first-come first-serve reservation sequence. For example, referring back to FIG. 1, access point AP1 could send three enable requests to clients C1-C3 in sequence. Access point AP1 could then continue the enable exchange with the client first to send its enable response. If client C2 responds first, then access point AP1 can activate the new key for client C2 and store this new key in its auxKeyID. Assuming that only one temporary storage location is provided in access point AP1, clients C1 and C3 would have to wait until the rekeying operation with client C2 is complete. In this case, the waiting stations can be queued in the order in which they respond to access point AP1's enable request.

In accordance with one embodiment of the invention, multiple temporary storage locations can be provided, thereby increasing the multiplexing capability of protocol 300. Specifically, if an N key table is provided for N clients, then M temporary storage locations can be provided, wherein M<N. Note that M could be a dynamic value determined by the available storage location available in the system at any particular point in time. In other embodiments, M could be a fixed value set by the system automatically or by a system administrator.

Because the likelihood that all N clients will need to change their keys at the same time is low, system efficiency remains high even if M is significantly lower than N. For example, if an access point is serving 100 clients (N=100), then the access point could reserve as few as 4 temporary storage locations (M=4). Thus, in this case, out of the 100 served clients, 4 clients could be rekeying at the same time. In this manner, instead of requiring 2N storage locations as in the known art for the rekeying of N clients, the present invention can dramatically reduce the total storage area required for rekeying.

Establishing a Valid Security Association

Figure 4:
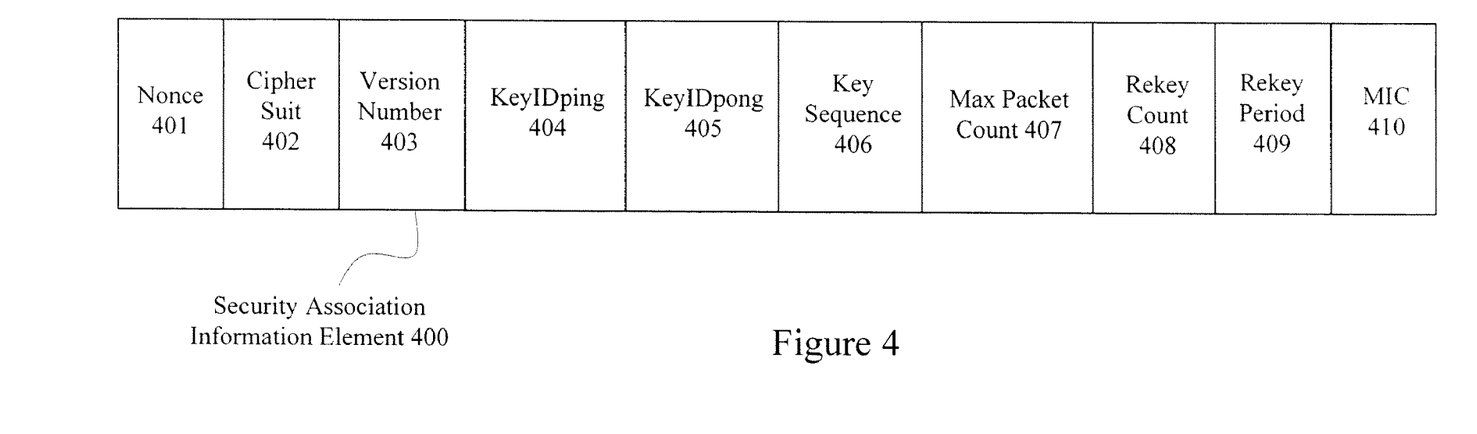
FIG. 4 illustrates an exemplary security association information element including a plurality of fields.

The rekeying protocol above follows the establishment of a valid security association in which both stations have a shared master key configured. In one embodiment, the security association can be established by having each station execute a 2-way request-response handshake, thereby allowing that station to verify the other station is alive and authentic. In one embodiment, each security association request and security association response includes a security association information element. The fields and format of the security association information element can be the same for both stations, i.e. either the rekey coordinator or the rekey participant, as well as for the security association request and response. FIG. 4 illustrates an exemplary security association information element 400 including fields 401-410.

A nonce field 401 can be a 16-byte random value. If the element is in a security association request, then it is the requestor's nonce. If the element is in a security association response, then the responder must also echo the requestor's nonce (wherein failure to do so means an unsuccessful security association). As appreciated by those skilled in the art of cryptography, a nonce should never be reused by the same station twice.

A cipher suite field 402 can be a 4-byte field that denotes the cipher suite enforcing the rekey protocol. The value in the cipher suite field is determined prior to establishing a valid security association, as it is required to determine the length of the temporary encryption key. Generally, the cipher suite is one of a set of cipher suites provided in the system.

A version number 403 can be a 2-byte field that denotes the version of the protocol.

The KeyIDping 404 can be a 2-bit value used to designate that the fixed location KeyIDstd storing the old key Ki−1 is to be used. In other words, KeyID ping value is an identifier that indicates when to use the index into the key map table that holds the old key KeyIDstd. Thus, standard logic to search the key map table can be augmented to use the key in the actual key map table only when the 2-bit KeyID field in the frame matches KeyIDping.

The KeyIDpong 405 can also be a 2-bit value used to designate that the temporary location auxKeyID storing the new key Ki is to be used for the duration of the rekey exchange. In other words, the KeyIDpong value is an identifier that indicates when to use the temporary storage holding the new key. Note that both the KeyIDping and KeyIDpong values must also be mutually agreed upon during the security association exchange. Because these are 2-way handshakes, there is no negotiation, it must be mutually agreed upon. The access point can ignore these fields in the initial enable sequence request sent by the client; however, all other messages must validate these fields. The access point can ignore this field because it is the access point that must manage its scarce resource when rekeying occurs.

The key sequence value 406 can be a 4-octet identifier that allows stations to synchronize to the appropriate place in the temporal key sequence (e.g. from Ki−1, to Ki, and then to Ki+1). This value is incremented on every rekey operation based on the length of key required, wherein the increment is based on the cipher suite 402. Thus, in one embodiment, if a 128-bit key or smaller is required, then the key sequence value is incremented by one. Similarly, if a 232-bit key value is required, then the key sequence value is incremented by two.

A max packet count 407 can be a 4-byte value denoting the high watermark or maximum number of packets that can be transmitted and received by the stations before an encryption key must be deemed obsolete. If the maximum packet count value is reached before a successful rekey, then the system's security has been compromised. In this case, a revoke key event should be triggered and traffic flow should halt.

A rekey count 408 can indicate the number of beacons (including the current beacon frame) that should appear before the next rekey will occur. A MIC value 410 can be the frame's message integrity check, which both prevents replays as well as authenticates the message exchanges. MIC value 410 is known to those skilled in the art and can be computed using any standard method.

Note that alternative methods of establishing a valid security association can also be used. For example, in one embodiment, the 5-message challenge request, as provided in the 1999 IEEE 802.11 specification, can be used.

Rekey Information Element

Figure 5:
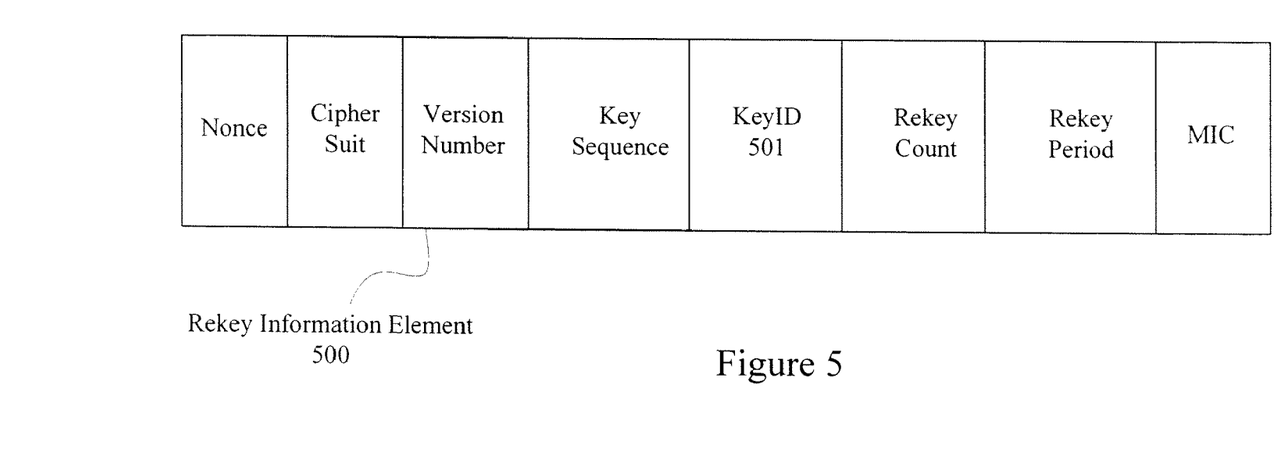
FIG. 5 illustrates one embodiment of a rekey information element that can be used in both the enable and transition exchanges described in reference to FIGS. 3A-3C.

The messages associated with the enable and transition exchanges can be management frames, wherein each frame includes the information required to securely synchronize an encryption in a rekey information element. FIG. 5 illustrates one embodiment of a rekey information element that can be used in both the enable and transition exchanges described in reference to FIGS. 3A-3C. Note that a majority of the fields previously described in reference to the security association information element of FIG. 4 can also be included in the rekey information element of FIG. 5. A KeyID value 501 can be a 1-byte field that indicates the agreed upon auxiliary index used for the rekeying. In one embodiment, the value can identify the actual key buffer used as the temporary storage location for the new key Ki.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art. Accordingly, it is intended that the scope of the invention only be defined by the following Claims and their equivalents.

The invention claimed is:

1. A system for updating an encryption key, the system including:
    a rekey coordinator implemented in a first station; and
    a rekey participant implemented in a second station,
    wherein one of the rekey coordinator and the rekey participant can initiate an enable exchange, the enable exchange triggering an activation of a new key and reserving an auxiliary location for the new key, and
    wherein only the rekey coordinator can initiate a transition exchange, the transition exchange synchronizing a transition from an old key to the new key, the auxiliary storage area being a temporary location on a computer-readable medium for the new key during a time interval when both the old key and the new key can be active.

2. The system of claim 1, wherein the rekey coordinator includes an access point and the rekey participant includes a client.

3. The system of claim 1, wherein the rekey coordinator includes a first access point and the rekey participant includes a second access point, wherein the first access point has a larger media access control address than the second access point.

4. The system of claim 1, wherein the rekey coordinator can send an enable request to the rekey participant during the enable exchange, the enable request requesting the rekey participant to activate the new key and reserve the auxiliary location in the rekey participant for the new key.

5. The system of claim 1, wherein the rekey participant can send an enable response to the rekey coordinator during the enable exchange, the enable response indicating that the rekey participant has activated the new key and stored the new key in its auxiliary location.

6. The system of claim 1, wherein the rekey coordinator can send a transition request to the rekey participant during the transition exchange that indicates the rekey coordinator has also activated the new key, stored the new key in its auxiliary location, has no more packets to transmit using the old key, and will use only the new key for new packets.

7. The system of claim 1, wherein the rekey participant can send a transition response to the rekey coordinator during the transition exchange that indicates the rekey participant has no more packets to transmit using the old key, updated its fixed location with the new key, and will use only the new key for new packets.

8. The system of claim 1, wherein the rekey coordinator can send a confirmation to the rekey participant during the transition exchange that indicates the rekey coordinator has updated its fixed location with the new key, thereby freeing its auxiliary location.

9. A rekeying sequence for a non-controlling station, the rekeying sequence comprising:
    sending a first message to a controlling station indicating that the non-controlling station has activated a new key and stored the new key in a first auxiliary location in the non-controlling station;
    determining that the controlling station has activated the new key, stored the new key in a second auxiliary location in the controlling station, and will use the new key for new packets;
    sending a second message to the controlling station indicating that the non-controlling station has sent its last packet using an old key; and updating a fixed location with the new key and releasing the first auxiliary location, each auxiliary storage area being a temporary location on a computer-readable medium for the new key during a time interval when both the old key and the new key can be active.

10. The rekeying sequence of claim 9, further including receiving a request from the controlling station to activate the new key and to store the new key in the first auxiliary location.

11. The rekeying sequence of claim 9, wherein if the controlling station has not activated the new key and stored the new key in the second auxiliary location, then entering a predetermined timeout.

12. The rekeying sequence of claim 11, wherein if a retry count is less than a predetermined number of retries after the predetermined timeout, then repeating sending the first message.

13. The rekeying sequence of claim 11, wherein if the retry count is not less than the predetermined number of retries after the predetermined timeout, then terminating the rekeying sequence.

14. The rekeying sequence of claim 9, wherein if the controlling station has not yet sent its last packet using the old key, then entering a predetermined timeout.

15. The rekeying sequence of claim 14, wherein if a retry count is less than a predetermined number of retries after the predetermined timeout, then repeating sending the second message.

16. The rekeying sequence of claim 14, wherein if the retry count is not less than the predetermined number of retries after the predetermined timeout, then terminating the rekeying sequence.

17. A computer-readable medium embodying a computer program product for a rekey coordinator that when executed by a processor performs a rekey operation, the computer program product comprising:

a first set of instructions for computing a new key and reserving an auxiliary storage area for the new key; and a second set of instructions for obsoleting an old key and switching to the new key, the auxiliary storage area being a temporary location for the new key during a time interval when both the old key and the new key can be active.

18. The computer-readable medium embodying the computer program product of claim 17, wherein the first set of instructions includes instructions for requesting a rekey participant to activate the new key and store the new key in a corresponding auxiliary storage area in the rekey participant.

19. The computer-readable medium embodying the computer program product of claim 17, wherein the first set of instructions includes instructions for acknowledging that a rekey participant has activated the new key and has stored the new key in a corresponding auxiliary storage area.

20. The computer-readable medium embodying the computer program product of claim 19, wherein the first set of instructions includes instructions for activating the new key and storing the new key in the auxiliary storage area.

21. The computer-readable medium embodying the computer program product of claim 20, wherein the second set of instructions includes instructions for requesting the rekey participant to start using the new key for encrypting new packets.

22. The computer-readable medium embodying the computer program product of claim 21, wherein the second set of instructions includes instructions for identifying that the rekey coordinator has no more packets to transmit using the old key.

23. The computer-readable medium embodying the computer program product of claim 22, wherein the second set of instructions includes instructions for communicating with the rekey participant that the rekey participant can use the old key for flushing messages in its transmitting queue.

24. The computer-readable medium embodying the computer program product of claim 22, wherein the second set of instructions includes instructions for communicating with the rekey participant that the rekey participant can use the new key for messages received from the rekey coordinator.

25. The computer-readable medium embodying the computer program product of claim 24, wherein the second set of instructions includes instructions for encrypting new packets only with the new key.

26. The computer-readable medium embodying the computer program product of claim 25, wherein the second set of instructions includes instructions for acknowledging that the rekey participant has no more packets to transmit with the old key.

27. The computer-readable medium embodying the computer program product of claim 26, wherein the second set of instructions includes instructions for acknowledging that the rekey participant will only use the new key for new packets.

28. The computer-readable medium embodying the computer program product of claim 27, wherein the second set of instruction includes instructions for acknowledging that the rekey participant has updated its fixed storage area with the new key.

29. The computer-readable medium embodying the computer program product of claim 28, wherein the second set of messages includes instructions for updating its fixed storage area with the new key and releasing its auxiliary storage area.

30. The computer-readable medium embodying the computer program product of claim 29, wherein the second set of messages includes instructions for confirming to the rekey participant that the rekey coordinator has updated its fixed storage area with the new key and released its auxiliary storage area.

31. The computer-readable medium embodying the computer program product of claim 17, wherein the rekey operation is applicable to multiple stations, and wherein the first set of instructions is communicated to a plurality of rekey participants.

* * * * *